(12) United States Patent
Ross

(10) Patent No.: US 7,987,740 B2
(45) Date of Patent: Aug. 2, 2011

(54) MULTI-SPEED TRANSMISSION WITH COUNTERSHAFT GEARING ARRANGEMENT

(75) Inventor: Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 12/203,469

(22) Filed: Sep. 3, 2008

(65) Prior Publication Data

US 2010/0050797 A1    Mar. 4, 2010

(51) Int. Cl.
*F16H 3/08* (2006.01)
(52) U.S. Cl. ......................................... 74/331
(58) Field of Classification Search ........................ None
See application file for complete search history.

(56) References Cited

U.S. PATENT DOCUMENTS

| | | | |
|---|---|---|---|
| 6,209,407 B1 | 4/2001 | Heinzel et al. | |
| 6,958,028 B2 | 10/2005 | Janson et al. | |
| 7,021,169 B2 | 4/2006 | Kobayashi | |
| 7,225,696 B2 * | 6/2007 | Gitt | 74/340 |
| 7,240,578 B2 | 7/2007 | Ogami et al. | |
| 7,272,985 B2 | 9/2007 | Gumpoltsberger et al. | |
| 7,340,973 B2 | 3/2008 | Hiraiwa | |
| 7,367,919 B2 | 5/2008 | Fahland et al. | |
| 7,383,749 B2 * | 6/2008 | Schafer et al. | 74/340 |
| 7,409,886 B2 | 8/2008 | Gitt | |
| 7,437,963 B2 | 10/2008 | Haka et al. | |
| 7,448,290 B2 | 11/2008 | Gitt | |
| 7,621,195 B2 * | 11/2009 | Hattori | 74/331 |
| 2004/0144190 A1 | 7/2004 | Hall, III | |
| 2005/0115345 A1 | 6/2005 | Gumpoltsberger | |
| 2005/0193848 A1 | 9/2005 | Gitt | |
| 2006/0117882 A1 | 6/2006 | Gitt | |
| 2006/0219033 A1 | 10/2006 | Gitt | |
| 2006/0266144 A1 | 11/2006 | Schafer et al. | |
| 2007/0022835 A1 | 2/2007 | Kilian et al. | |
| 2007/0113696 A1 | 5/2007 | Haka et al. | |
| 2007/0180942 A1 | 8/2007 | Antonov | |
| 2007/0214906 A1 | 9/2007 | Fahland et al. | |
| 2007/0220999 A1 | 9/2007 | Hatori et al. | |
| 2007/0240530 A1 | 10/2007 | Ogami et al. | |
| 2007/0289399 A1 | 12/2007 | Tanba et al. | |
| 2008/0034905 A1 | 2/2008 | Hatori et al. | |
| 2008/0047378 A1 | 2/2008 | Borgerson et al. | |
| 2008/0047379 A1 | 2/2008 | Borgerson et al. | |
| 2008/0134818 A1 | 6/2008 | Gitt | |
| 2008/0134820 A1 | 6/2008 | Bjorck et al. | |
| 2008/0141808 A1 | 6/2008 | Gumpoltsberger | |
| 2008/0196526 A1 | 8/2008 | Singh et al. | |
| 2008/0202265 A1 | 8/2008 | Hendrickson et al. | |
| 2008/0202266 A1 | 8/2008 | Hendrickson et al. | |
| 2008/0202267 A1 | 8/2008 | Hendrickson et al. | |
| 2008/0202268 A1 | 8/2008 | Carey et al. | |

FOREIGN PATENT DOCUMENTS

DE    10310472 A1    10/2003
(Continued)

*Primary Examiner* — David D Le
*Assistant Examiner* — David J Hlavka

(57) ABSTRACT

A transmission includes an input member, an output member, a first and second interconnecting member, a plurality of countershafts, a reverse member, a plurality of co-planar gear sets, and a plurality of torque transmitting devices. The torque transmitting devices include synchronizer assemblies and a dual clutch assembly. The transmission is operable to provide at least one reverse speed ratio and a plurality of forward speed ratios between the input member and the output member.

23 Claims, 1 Drawing Sheet

FOREIGN PATENT DOCUMENTS

| | | |
|---|---|---|
| DE | 102006016059 A1 | 10/2007 |
| DE | 102006016397 A1 | 10/2007 |
| WO | WO2005021999 A1 | 3/2005 |
| WO | WO2005093289 A1 | 10/2005 |
| WO | WO2006106534 A1 | 10/2006 |
| WO | WO2006128626 A1 | 12/2006 |

* cited by examiner

MULTI-SPEED TRANSMISSION WITH COUNTERSHAFT GEARING ARRANGEMENT

TECHNICAL FIELD

The present disclosure relates to transmissions, and more particularly to a compact multiple speed transmission having dual countershafts and a dedicated reverse shaft.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second interconnecting members, a plurality of countershafts, a reverse member, a plurality of co-planar gear sets, and a plurality of torque transmitting devices. The torque transmitting devices include synchronizer assemblies and a dual clutch assembly. The transmission is operable to provide at least one reverse speed ratio and a plurality of forward speed ratios between the input member and the output member.

In one aspect of the present invention, the reverse member is located near a lower countershaft.

In another aspect of the present invention, the transmission includes five co-planar gear sets.

In yet another aspect of the present invention, the transmission includes five synchronizer assemblies.

In yet another aspect of the present invention, the transmission is operable to provide at least seven forward speed ratios.

The above features and advantages and other features and advantages of the present invention are readily apparent from the following detailed description of the best modes for carrying out the invention when taken in connection with the accompanying drawings.

DESCRIPTION

Figure 1:
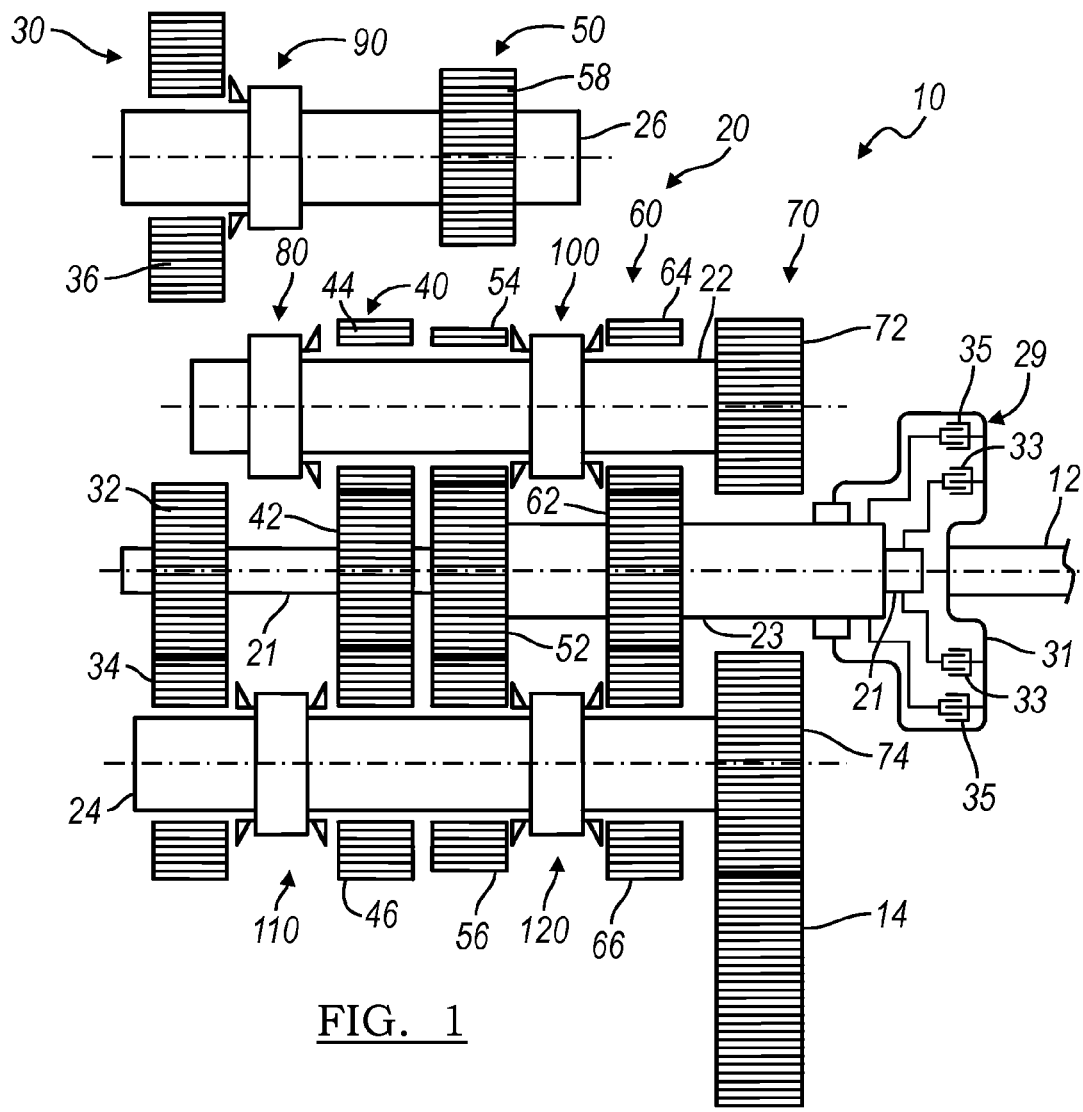
FIG. 1 is a side cross-sectional view of an embodiment of a transmission in accordance with the present invention.

Referring to the drawings, wherein like reference numbers refer to like components, in FIG. 1 a multiple speed transmission is generally indicated by reference number 10. The transmission 10 includes an input member 12 and output member 14. In the present embodiment, the input member 12 is a shaft and the output member 14 is a final drive gear, however those skilled in the art will appreciate that the input member 12 may be components other than shafts and the output member 14 may be a component, such as a shaft, other than a gear. The input member 12 is continuously connected with a torque converter (not shown) or other starting device. An engine (not shown) is connected to and provides a driving torque to the torque converter. The output member 14 is continuously connected with a final drive unit (not shown) including a differential (not shown). The transmission 10 includes a countershaft gearing arrangement 20 that includes various shafts or members, co-planar intermeshing gear sets, a dual clutch assembly, and selectively engageable synchronizers, as will be described herein. For example, the countershaft gearing arrangement 20 includes a first interconnecting member 21, a second interconnecting member 23, a first countershaft 22, or upper member, a second countershaft 24, or lower member, and a reverse shaft or member 26. The second interconnecting member 23 is a sleeve shaft that is concentric with the first interconnecting member 21. The countershafts 22, 24 and the reverse member 26 are each spaced apart from and parallel with the input member 12.

Figure 2:
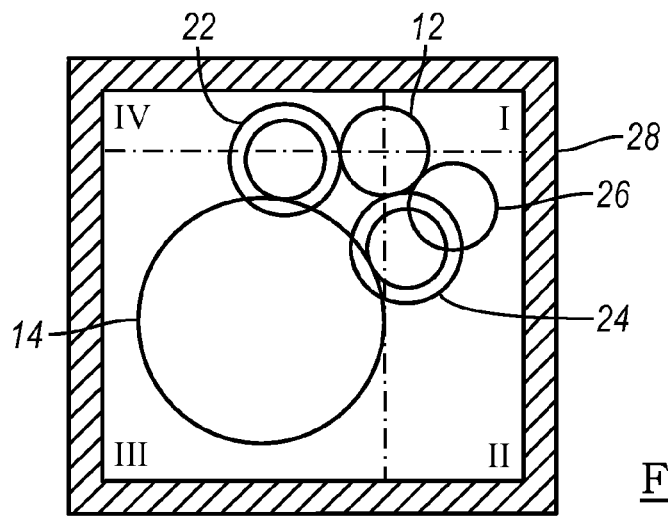
FIG. 2 is a schematic end view illustrating the placement of various members of an embodiment of a transmission in accordance with the present invention.

Turning to FIG. 2, the input member 12, output member 14, the countershafts 22, 24, and the reverse member 26 are arranged within a housing 28 in order to maximize the compactness of the transmission 10. More specifically, the transmission 10 is divided into four quadrants I, II, III, IV. Each quadrant is defined by the housing 28 and the centerline of the input member 12. For example, the output member 14 is located to the left and below the input member 12, i.e. in quadrant III. The first countershaft 22 is located slightly above and to the left of the input member 12, i.e. in quadrants III and IV. The second countershaft 24 is located below and slightly to the right of the input member 12, i.e. in quadrants II and III. The reverse member 26 is located below and to the right of the input member 12, i.e. in quadrants II, and more specifically horizontally to the right of the second countershaft 24 and vertically between the first second countershafts 22, 24. The interconnection of the countershafts 22, 24, the reverse member 26, the input member 12, and the output member 14 will be described in greater detail below.

Returning to FIG. 1, a dual clutch assembly 29 is connected between the input member 12 and first and second interconnecting shafts 21, 23. The dual clutch assembly 29 includes a clutch housing 31 connected for common rotation with input shaft 12. Further, the dual clutch assembly 29 has first and second clutch elements or hubs 33 and 35. Clutch elements 33 and 35 together with housing 31 are configured to form a friction clutch, as well known in the art as a dual clutch. More specifically, clutch elements 33, and clutch housing 31 have friction plates (not shown) mounted thereon that interact to form a friction clutch. The clutch element 33 is connected for common rotation with the first interconnecting shaft 21 and the clutch element 35 is connected for common rotation with the second interconnecting shaft 23. Thus, selective engagement of clutch element 33 with the clutch housing 31 connects the input member 12 for common rotation with the first interconnecting shaft 21 and selective engagement of clutch element 35 with the clutch housing 31 connects the input member 12 for common rotation with the second interconnecting shaft 23.

The countershaft gearing arrangement 20 also includes a plurality of co-planar, intermeshing gear sets 30, 40, 50, 60, and 70. Co-planar gear set 30 includes gear 32, gear 34, and gear 36. Gear 32 is connected for common rotation with the first interconnecting member 21 and intermeshes with gear 34 and gear 36. Gear 34 is selectively connectable for common rotation with the second countershaft 24. Gear 36 is selectively connectable for common rotation with the reverse member 26.

Co-planar gear set 40 includes gear 42, gear 44, and gear 46. Gear 42 is connected for common rotation with the first interconnecting member 21 and intermeshes with gear 44 and gear 46. Gear 44 is selectively connectable for common rotation with the first countershaft 22. Gear 46 is selectively connectable for common rotation with the second countershaft 24. Gear set 40 is located adjacent gear set 30.

Co-planar gear set 50 includes gear 52, gear 54, gear 56, and gear 58. Gear 52 is connected for common rotation with the second interconnecting member 23 and intermeshes with gear 54 and gear 56. Gear 54 is selectively connectable for common rotation with the first countershaft 22. Gear 56 is selectively connectable for common rotation with the second countershaft 24 and is also intermeshed with gear 58. Gear 58 is connected for common rotation with the reverse member 26. Gear set 50 is located adjacent gear set 40.

Co-planar gear set 60 includes gear 62, gear 64, and gear 66. Gear 62 is connected for common rotation with the second interconnecting member 23 and intermeshes with gear 64 and gear 66. Gear 64 is selectively connectable for common rotation with the first countershaft 22. Gear 66 is selectively connectable for common rotation with the second countershaft 24. Gear set 60 is located adjacent gear set 50.

Co-planar or transfer gear set 70 includes gear 72 and gear 74. Gear 72 is connected for common rotation with the first countershaft 22 and intermeshes with the output member 14. Gear 74 is connected for common rotation with the second countershaft 24 and is also intermeshed with the output member 14. Gear set 70 is located adjacent gear set 60.

In an alternate embodiment of the transmission of the present invention, gear 58 is intermeshed with gear 66 rather than gear 56 and forms part of co-planar gear set 60 rather than co-planar gear set 50. This is accomplished by extending the length of the reverse member 26 and aligning gear 58 with gear 66.

The transmission 10 further includes a plurality of selectively engageable synchronizer assemblies 80, 90, 100, 110, and 120. Synchronizers 80 and 90 are single sided synchronizers that generally include a shift fork (not shown) that is bi-directionally translated by an actuator (not shown) into one engaged position and a neutral or disengaged position. For example, synchronizer 80 is selectively engageable to connect gear 44 with the first countershaft 22 for common rotation therewith. Synchronizer 90 is selectively engageable to connect gear 36 with the reverse member 26 for common rotation therewith. Synchronizers 100, 110, and 120 are double sided synchronizers and generally include a shift fork (not shown) that is bi-directionally translated by an actuator (not shown) into at least two engaged positions and a neutral or disengaged position. For example, synchronizer 100 is selectively engageable to connect gear 54 with the first countershaft 22 for common rotation therewith and is selectively engageable to connect gear 64 with the first countershaft 22 for common rotation therewith. Synchronizer 110 is selectively engageable to connect gear 34 with the second countershaft 24 for common rotation therewith and is selectively engageable to connect gear 46 with the second countershaft 24 for common rotation therewith. Synchronizer 120 is selectively engageable to connect gear 56 with the second countershaft 24 for common rotation therewith and is selectively engageable to connect gear 66 with the second countershaft 24 for common rotation therewith.

The transmission 10 is capable of transmitting torque from the input shaft 12 to the output shaft 14 in at least seven forward torque ratios and at least one reverse torque ratio. However, fewer or more forward torque ratios may be added without departing from the scope of the present invention. Each of the forward torque ratios and the reverse torque ratio is attained by engagement of the dual clutch assembly 29 and one or more of the synchronizer assemblies 80, 90, 100, 110, and 120. Those skilled in the art will readily understand that a different speed ratio is associated with each torque ratio.

It should be appreciated that each individual gear set 30, 40, 50, and 60 provides one or more forward and/or reverse gear ratio upon selective engagement of the synchronizer assemblies 80, 90, 100, 110, and 120 and that which synchronizer and which gear set are associated with which forward or reverse speed ratio may vary without departing from the scope of the present invention.

For example, to establish the reverse torque ratio, clutch element 33 is engaged to couple the input member 12 with the first interconnecting member 21, synchronizer 90 is engaged and couples the gear 36 to the reverse member 26 and synchronizer 120 is engaged to couple gear 56 to the second countershaft 24. Input torque from the input shaft 12 is transferred through gear 32 to gear 36, through the reverse member 26 to gear 58, from gear 58 to gear 56, through the second countershaft 24 to gear 74, and from gear 74 to the output 14. In the embodiment where gear 58 is intermeshed with gear 66, then synchronizer 120 couples gear 66 to the second countershaft 24. This allows synchronizer 120 to remain engaged when the transmission is shifted into first gear, as will be described below. It should be appreciated that which gear set is selected as the reverse torque ratio is preferably dependent on which of the gears 54, 56, 64, and 66 is set as the first forward torque ratio so that the synchronizer assembly 100, 120 that is already engaged for reverse gear does not have to be changed for 1st gear.

To establish a first forward torque ratio (i.e. a 1st gear), clutch element 35 is engaged to couple the input member 12 with the second interconnecting member 23, synchronizer 120 couples gear 66 to the second countershaft 24. Input torque from the input member 12 is transferred through gear 62 to gear 66, through the second countershaft 24 to gear 74, and from gear 74 to the output 14.

To establish a second forward torque ratio (i.e. a 2nd gear), clutch element 33 is engaged to couple the input member 12 with the first interconnecting member 21, synchronizer 110 couples gear 34 to the second countershaft 24. Input torque from the input member 12 is transferred through gear 32 to gear 34, through the second countershaft 24 to gear 74, and from gear 74 to the output 14.

To establish a third forward torque ratio (i.e. a 3rd gear), clutch element 35 is engaged to couple the input member 12 with the second interconnecting member 23, synchronizer 120 couples gear 56 to the second countershaft 24. Input torque from the input member 12 is transferred through gear 52 to gear 56, through the second countershaft 24 to gear 74, and from gear 74 to the output 14.

To establish a fourth forward torque ratio (i.e. a 4th gear), clutch element 33 is engaged to couple the input member 12 with the first interconnecting member 21, synchronizer 110 couples gear 46 to the second countershaft 24. Input torque from the input member 12 is transferred through gear 42 to gear 46, through the second countershaft 24 to gear 74, and from gear 74 to the output 14.

To establish a fifth forward torque ratio (i.e. a 5th gear), clutch element 35 is engaged to couple the input member 12 with the second interconnecting member 23, synchronizer 100 couples gear 64 to the first countershaft 22. Input torque from the input member 12 is transferred through gear 62 to gear 64, through the first countershaft 22 to gear 72, and from gear 72 to the output 14.

To establish a sixth forward torque ratio (i.e. a 6th gear), clutch element 33 is engaged to couple the input member 12 with the first interconnecting member 21, synchronizer 80 couples gear 44 to the first countershaft 22. Input torque from the input member 12 is transferred through gear 42 to gear 44, through the first countershaft 22 to gear 72, and from gear 72 to the output 14.

To establish a seventh forward torque ratio (i.e. a 7th gear), clutch element 35 is engaged to couple the input member 12 with the second interconnecting member 23, synchronizer 100 couples gear 54 to the first countershaft 22. Input torque from the input member 12 is transferred through gear 52 to gear 54, through the first countershaft 22 to gear 72, and from gear 72 to the output 14.

Again, it should be appreciated that the which of the gear sets 30, 40, 50, and 60 are associated with which forward and reverse torque ratio may be changed from the above example without departing from the scope of the present invention.

The present invention contemplates that a variety of torque ratios (i.e., the ratio of torque of the output member 14 to the input member 12) are achievable through the selection of tooth counts of the gears of the transmission 10. Moreover, the present invention advantageously provides the reverse member 26 to be located lower in the transmission 10 near the second countershaft 24 to create a more compact arrangement. This arrangement provides the opportunity to achieve reduced transmission length in comparison with other dual countershaft transmissions.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a first interconnecting member;
   a second interconnecting member;
   a dual clutch assembly for selectively coupling the input member with the first interconnecting member and the second interconnecting member;
   first, second, third, and fourth gear sets each having a first gear intermeshed with a second gear and a third gear, wherein the first and second gear sets are continuously interconnected with the first interconnecting member, the third and fourth gear sets are continuously interconnected with the second interconnecting member;
   a fifth gear set having a first gear and a second gear;
   a first countershaft continuously connected to the fifth gear set;
   a second countershaft continuously connected to the fifth gear set;
   a reverse shaft having a fourth gear intermeshed with at least one of the second, third and fourth gear sets; and
   five synchronizer assemblies each for selectively coupling at least one of the first, second, third, and fourth gear sets with at least one of the first countershaft, the second countershaft, and the reverse shaft, and wherein the five synchronizer assemblies and the dual clutch assembly are selectively engageable to establish a plurality of forward speed ratios and at least one reverse speed ratio between the input member and the output member.

2. The transmission of claim 1 wherein the first countershaft and the second countershaft are each located radially outward from and parallel to the input member.

3. The transmission of claim 1 wherein the output member is a final drive transfer gear in a differential.

4. The transmission of claim 1 wherein the reverse shaft is located radially outward from and parallel to the input member.

5. The transmission of claim 1 wherein the first countershaft is located at least partially above the reverse shaft and the second countershaft.

6. The transmission of claim 5 wherein the reverse shaft is located at least partially above the second countershaft.

7. The transmission of claim 1 wherein the first, second, third, fourth, and fifth gear sets are co-planar gear sets.

8. The transmission of claim 1 wherein the first gears of the first and second gear sets are continuously interconnected to the first interconnecting member and the first gears of the third and fourth gear sets are continuously connected to the second interconnecting member.

9. The transmission of claim 8 wherein a first of the five synchronizer assemblies selectively connects the second gear of the first gear set to the reverse shaft.

10. The transmission of claim 9 wherein a second of the five synchronizer assemblies selectively connects the second gear of the second gear set to the first countershaft.

11. The transmission of claim 10 wherein a third of the five synchronizer assemblies selectively connects one of the second gear of the third gear set and second gear of the fourth gear set to the first countershaft.

12. The transmission of claim 11 wherein a fourth of the five synchronizer assemblies selectively connects one of the third gear of the first gear set and the third gear of the second gear set to the second countershaft.

13. The transmission of claim 12 wherein a fifth of the five synchronizer assemblies selectively connects one of the third gear of the third gear set and the third gear of the fourth gear set to the second countershaft.

14. The transmission of claim 1 wherein the first gear of the fifth gear set is continuously interconnected to the first countershaft and is intermeshed with the output member and the second gear of the fifth gear set is continuously interconnected to the second countershaft and is intermeshed with the output member.

15. A transmission comprising:
   an input member;
   an output member;
   a first interconnecting member;
   a second interconnecting member;
   a dual clutch assembly for selectively coupling the input member with the first interconnecting member and the second interconnecting member;
   first, second, third, and fourth gear sets each having a first gear intermeshed with a second gear and a third gear, wherein the first and second gear sets are continuously interconnected with the first interconnecting member, the third and fourth gear sets are continuously interconnected with the second interconnecting member;
   a fifth gear set having a first gear and a second gear;
   a first countershaft continuously connected to the fifth gear set;

a second countershaft continuously connected to the fifth gear set;

a reverse shaft having a fourth gear intermeshed with at least one of the second, third and fourth gear sets;

a first synchronizer assembly for selectively connecting the second gear of the first gear set to the reverse shaft;

a second synchronizer assembly for selectively connecting the second gear of the second gear set to the first countershaft;

a third synchronizer assembly for selectively connecting one of the second gear of the third gear set and second gear of the fourth gear set to the first countershaft;

a fourth synchronizer assembly for selectively connecting one of the third gear of the first gear set and the third gear of the second gear set to the second countershaft; and a fifth synchronizer assembly for selectively connecting one of the third gear of the third gear set and the third gear of the fourth gear set to the second countershaft, and wherein the five synchronizer assemblies and the dual clutch assembly are selectively engageable to establish a plurality of forward speed ratios and at least one reverse speed ratio between the input member and the output member.

16. The transmission of claim 15 wherein the first countershaft and the second countershaft are each located radially outward from and parallel to the input member.

17. The transmission of claim 15 wherein the output member is a final drive transfer gear in a differential.

18. The transmission of claim 15 wherein the reverse shaft is located radially outward from and parallel to the input member.

19. The transmission of claim 15 wherein the first countershaft is located at least partially above the reverse shaft and the second countershaft.

20. The transmission of claim 15 wherein the reverse shaft is located at least partially above the second countershaft.

21. The transmission of claim 15 wherein the first gears of the first and second gear sets are continuously interconnected to the first interconnecting member and the first gears of the third and fourth gear sets are continuously interconnected to the second interconnecting member.

22. The transmission of claim 15 wherein the first gear of the fifth gear set is continuously interconnected to the first countershaft and is intermeshed with the output member and the second gear of the fifth gear set is continuously interconnected to the second countershaft and is intermeshed with the output member.

23. A transmission comprising:

an input member;

an output member;

a first interconnecting member;

a second interconnecting member;

a dual clutch assembly for selectively coupling the input member with the first interconnecting member and the second interconnecting member;

first, second, third, and fourth gear sets each having a first gear intermeshed with a second gear and a third gear, wherein the first and second gear sets are continuously interconnected with the first interconnecting member, the third and fourth gear sets are continuously interconnected with the second interconnecting member;

a fifth gear set having a first gear and a second gear;

a first countershaft continuously connected to the fifth gear set and located radially outward from and parallel to the first and second interconnecting members;

a second countershaft continuously connected to the fifth gear set and located radially outward from and parallel to the input member;

a reverse shaft having a fourth gear intermeshed with at least one of the second, third and fourth gear sets and located radially outward from and parallel to the input member and located at least partially below the first countershaft and at least partially above the second countershaft;

a first synchronizer assembly for selectively connecting the second gear of the first gear set to the reverse shaft;

a second synchronizer assembly for selectively connecting the second gear of the second gear set to the first countershaft;

a third synchronizer assembly for selectively connecting one of the second gear of the third gear set and second gear of the fourth gear set to the first countershaft;

a fourth synchronizer assembly for selectively connecting one of the third gear of the first gear set and the third gear of the second gear set to the second countershaft; and a fifth synchronizer assembly for selectively connecting one of the third gear of the third gear set and the third gear of the fourth gear set to the second countershaft, wherein the five synchronizer assemblies and the dual clutch assembly are selectively engageable to establish at least seven forward speed ratios and at least one reverse speed ratio between the input member and the output member.

* * * * *